S. Lewis,
Ice Plane.

No. 92,325.        Patented July 6, 1869.

Witnesses        Inventor
Samuel Lewis
per Attorneys

United States Patent Office.

SAMUEL LEWIS, OF WILLIAMSBURG, NEW YORK.

*Letters Patent No. 92,325, dated July 6, 1869.*

IMPROVEMENT IN ICE-PLANERS.

The Schedule referred to in these Letters Patent and making part of the same.

*To all whom it may concern:*

Be it known that I, SAMUEL LEWIS, of Williamsburg, in the county of Kings, and State of New York, have invented a new and useful Improvement in Ice-Planers; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to improve the construction of my improved ice-planer, patented March 3, 1868, and numbered 75,029, so as to make it more convenient in use, more easily adjusted, and more effective in operation: and It consists in the construction and combination of various parts of the machine, as hereinafter more fully described.

A is the frame of the machine, which I usually form of three cross-bars or beams, and two longitudinal bars securely and strongly framed together.

Figure 1:
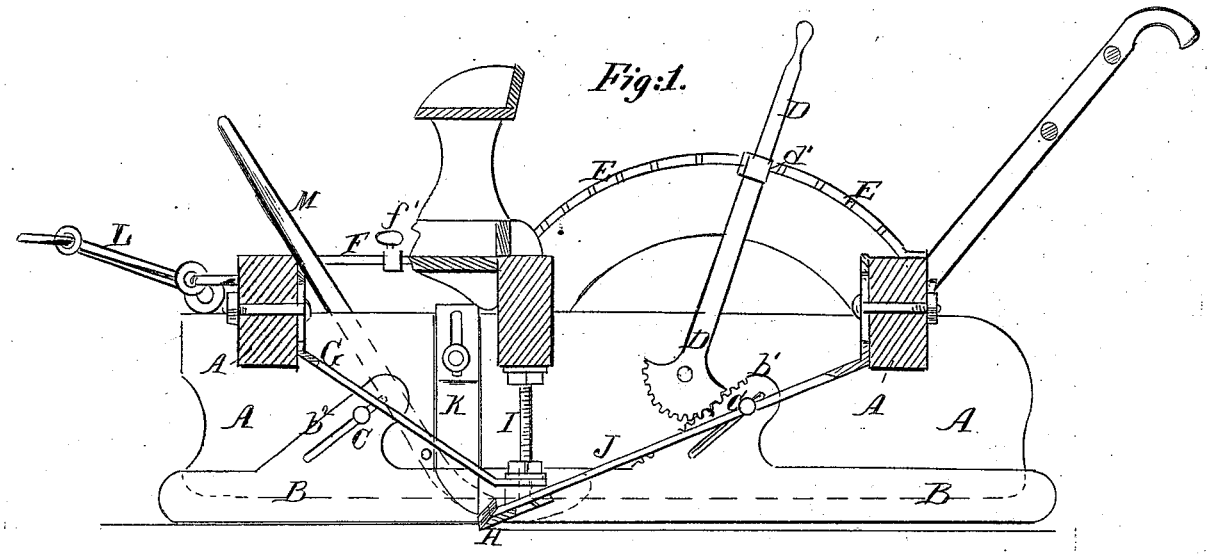
Figure 1 is a vertical longitudinal section of my improved machine, taken through the line $x\ x$, fig. 2.

B are the slides or runners, which are made with two inclined arms or parts, $b^1\ b^2$, which are slotted to receive the bolts or pins C, by which they are secured to the longitudinal bars of the frame A, and upon which the said runners slide up and down. Upon the upper edges of the rear arms $b^1$ are formed rack-teeth, as shown in fig. 1.

D are levers which are pivoted to the longitudinal bars A, and upon the lower ends of which are formed the segments of gear-wheels, the teeth of which mesh into the rack-teeth of the arms $b^1$, so that by operating the said levers D, the slides or runners B may be raised and lowered as desired.

E are arcs or curved plates attached to the frame A, which is divided off into a scale, and is made with notches upon its edge, into which the catch $d'$, formed upon or attached to the levers D, catches so as to hold the runners B securely in any position into which they may be adjusted, according to the required depth of cut. For instance, if a quarter-of-an-inch cut is to be made, the catch $d'$ would be adjusted at the first notch, at the forward end of the arcs E; if half-an-inch cut, the said catch should be adjusted in the second notch, and so on to a cut of three inches.

F are straps or bars attached to the forward part of the frame A, and which should be divided off into scales similar to and corresponding with the scales of the arcs E.

The bars F are provided with adjustable stops, $f$, secured in place by set-screws, so that when the levers D have been adjusted in place, the stops $f$ may be adjusted in a corresponding position, so as to stop the brake in such a position that it will support the knife and the entire side of the machine at a planing-level, as hereinafter described.

G are the front brace-bars or rods, the forward ends of which are adjustably secured to the front cross-bar of the frame A, by bolts passing through the said bar or beam, through slots in the said brace-bars, as shown in fig. 1, so as to admit of an easy clearance of the ice-cuttings.

The rear ends of the brace-bars G are secured to the knife H, adjusting-screws I, and rear brace-bars J, so as to give additional strength and support to the knife.

K are the vertical cutters that mark the ice at the inner edge of the swath, and which are adjustably attached to the longitudinal bars of the frame A, by bolts passing through the said bars, and through slots in the said knives K. The knives or cutters K are arranged with their curved edges forward, as shown in fig. 1, so as to mark the ice rather than cut it.

Figure 2:
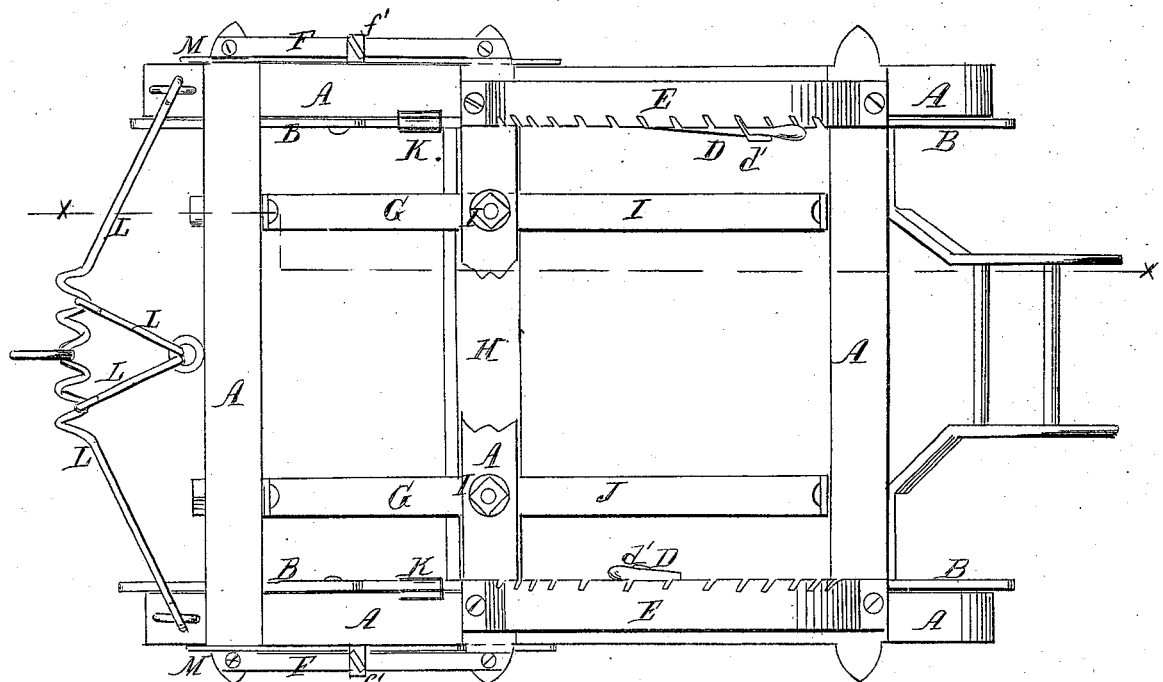
Figure 2 is a top or plan view of the same.

L is the draught-attachment, which is braced and connected with the frame A, in the manner shown in fig. 2.

The device L is formed with three or more notches in its middle part for the attachment of the draught, so that the point of draught-attachment may be adjusted, as the circumstances of the case may require, to keep the horses off the planed ice, thereby preventing the forming calk-marks or other disfigurements upon the said planed surface.

By attaching the draught in the end-loop or notch on the side towards the unplaned ice, the horses will travel upon the unplaned ice, and thus be unable to mar or mark the planed surface.

In operating the machine, the first thing is to decide upon the depth of the cut, and the direction in which it is to be made, the planer being supposed to be upon the ice, in position to start, and with the edge of the knife H and runners B flush, horizontally, with each other. Then if the cut is to be made an inch deep, and if I purpose to work with the bank of the pond upon my right hand, the left-hand or pondward lever D is placed in the fourth notch of the arc E, from its forward end, which adjustment will raise the runner D, upon that side of the machine, an inch above the horizontal line of the knife H. The lever D, upon the other or landward side of the machine, should be left in the first or forward notch of its arc E, so as to leave the runner B, upon that side, upon the same horizontal line with the edge of the knife H. The machine is then started, and the planed surface of the first cut or swath will be inclined from nothing at the edge of the pond, to an inch in depth at the inner edge of said cut. The machine is then placed so as to plane another side of the pond, and so on until a swath has been cut entirely around the pond.

As the machine approaches the point of beginning, the operator, who has been guiding the machine, comes forward, and, just as the knife approaches, at right angles, the line of the first cut, throws the brake M, on the inner side, back against the stop $f$, so that the said brake may sustain the inner or cutting-end of the knife H at a level with the surface of the ice first cut.

This construction enables me to complete a swath at right angles with another one, so smoothly as to render it impossible to perceive where the said swaths either begin or end.

Without this arrangement, the knife H would cut into the finished or planed ice upon arriving at the end of every length of cutting, but the brake M prevents this by supporting that side of the machine, and prevents the dropping down of that side when it runs off the uncut ice, and thus prevents the knife H from cutting into and spoiling the planed surface.

When the four sides of the pond have been thus planed, and the machine has been turned into position to begin the next circuit, the said planer is so placed, that its landward runner, B, may lie snugly up against the step or shoulder formed by making the first cut, the brake being kept home to the stop $f$, until the planer has been drawn upon the uncut ice, and the knife begins to work. The planer is now upon a level keel, one runner running upon the uncut ice, and the other upon the smooth surface of the planed ice. In this way the work is continued until the whole surface of the pond has been planed.

In case of planing back and forth, or in parallel swaths, the positions of the two levers D have to be reversed at the end of each cut, and the planer turned so as to point in the opposite direction, the operation, in other respects, being the same as before described.

The levers D and brakes M are particularly convenient in planing surfaces of irregular configuration, since they enable the operator to take off angles and curves until a form is produced that enables the work to be done most easily and perfectly.

Having thus described my invention,

I claim as new, and desire to secure by Letters Patent—

1. The pivoted lever D, constructed with toothed segmental ends in combination with the inclined racks $b'$, formed upon the runners B, arranged and operating as described, for the purpose specified.

2. The combination of the gauge-rack bar E, levers D, and runners B, with each other, substantially as herein shown and described, and for the purpose set forth.

3. The combination of the gauge-bars F and adjustable stops $f$ with the brakes M, substantially as herein shown and described, and for the purpose set forth.

4. The draught-attachment L, constructed as described, in combination with the frame of an ice-planer, substantially as herein shown and described, and for the purpose set forth.

5. Arranging the vertical cutters K, with their curved edges forward, substantially as herein shown and described, and for the purpose set forth.

The above specification of my invention signed by me, this 25th day of November, 1868.

SAMUEL LEWIS.

Witnesses:
FRANK BLOCKLEY,
JAMES T. GRAHAM.